Jan. 20, 1953     R. W. OLSON     2,626,381

VARIABLE RESISTANCE DISTRIBUTED SEISMOMETER

Filed Jan. 27, 1948

Inventor
*Robert W. Olson*

By *Stevens, Davis and Miller*
Attorneys

Patented Jan. 20, 1953

2,626,381

UNITED STATES PATENT OFFICE 2,626,381

VARIABLE RESISTANCE DISTRIBUTED SEISMOMETER

Robert W. Olson, Dallas, Tex., assignor to "Texas Instruments Incorporated," a corporation of Delaware Application January 27, 1948, Serial No. 4,598

1 Claim. (Cl. 340—17)

This invention relates to the detection and recording of any kind of compressional waves, and is more particularly related to a seismometer for detecting waves which are propagated through the earth.

In the development of seismometers, and particularly in the development of seismometers for subterranean prospecting, efforts have been made to improve the sensitivity and resolving power of the apparatus so that waves reflected from very deep strata will produce records of sufficient clarity and accuracy to permit valuable determinations to be made therefrom. Considerable success has been achieved in this respect and the seismometers now used are possessed of very high sensitivity. Increases in the sensitivity of seismometers, however, have introduced certain problems in that the records which they make include various extraneous and undesired data produced from responses to ground waves and surface noises which, in general, are horizontal waves moving through the crust of the earth. These ground waves are recorded and can be confused with the desired waves from the subterranean strata, rendering the record as a whole difficult of interpretation.

Thus it is that in recent years various compositing and amplifying schemes have been developed for the purpose of emphasizing the desired waves from subterranean strata and for eliminating or deemphasizing as completely as possible the undesired ground waves and surface noises. While these schemes and arrangements have met with some success, in limited areas, they tend to increase the complexity, delicacy and cost of the seismograph system to a considerable extent.

Accordingly, it is an object of this invention to provide an extremely sensitive seismometer with high resolving power of simple design which will detect the desired waves of low amplitude but which will, to a large extent, eliminate ground waves and other surface disturbances.

There are many areas of vital concern to the petroleum industry and which the petroleum industry is anxious to explore with a seismograph system. Present seismograph systems, due to their lack of resolving power, are not suitable for this exploration and it is believed that the seismograph system herein disclosed can be used to effectively explore such areas in view of the high degree of directional selectivity made possible thereby.

It is contemplated, according to the present invention, to provide a rugged and simple seismometer of the variable impedance type which is characterized by a high degree of directional selectivity.

Other objects and advantages of the invention will be apparent upon consideration of the following detailed decription of a preferred embodiment thereof in conjunction with the annexed drawings wherein.

Figure 2:
Figure 2 is a vertical sectional view of a portion of one embodiment of the seismometer of the present invention.
Figure 3:
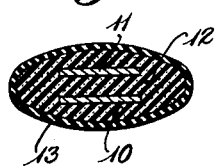
Figure 3 is a sectional view taken on line 3—3 of Figure 2.

Referring now in greater detail to the drawings, and in particular to Figures 2 and 3 thereof, the detecting element 9 of the seismometer is comprised of a pair of flat ribbon conductors 10 and 11 separated and surrounded by a compressible rubber material 12 which is impregnated with evenly distributed particles of some conductor such as carbon. It is to be noted that a protective sheathing 13 is provided for the rubber-carbon material 12. This sheathing is composed of a flexible, nonconductive material such as soft rubber, rubberized fabrics or the like. The conductors 10 and 11 project from one end of this sheathing so that they may be connected in a circuit.

It is found that if a stable potential difference is established between the conductor 10 and the conductor 11, there is, under repose conditions, a flow of current between 11 and 10 in accordance with the quotient of the applied potential divided by the resistance of the material 12. It is equally apparent that if the rubber-carbon material 12 is deformed its resistance will be changed and the current which will flow through it will vary.

Similarly the conductivity decreases upon expansion of the rubber material 12 because of the increased separation of the conductive particles. Thus the detector 9 is a variable resistor, the resistance of which varies as a function of the deformation of the rubber-carbon material 12.

The foregoing discussion has relation solely to the characteristics of the detecting element under a constant E. M. F. Actually, when subjected to a variable E. M. F., the impedance of the rubber-carbon material is changed as the material 12 is distorted and causes a change in the spacing between the carbon particles. Furthermore, under operating conditions the conductors 10 and 11 themselves move toward and away from one another and hence change the capacitance of the circuit in which they are connected.

If now the detector 9 comprised of the conductors 10 and 11 and the rubber material 12, is placed on the ground so that it is actuated by the many waves present in the earth, it is apparent that the waves impinging upon its surface will deform the rubber material 12 and cause a change in its impedance. If then the detector 9, which is diagrammatically represented in Figure 1 as a variable impedance, is connected in circuit with a potential source such as a battery 27 and a transformer primary 14, it is apparent that the selection of the susceptance of the rubber material 12 can be so made as to maintain under normal, non-shock conditions, a specified value of resistance. However, when the rubber material 12 is subjected to shock, and its resistance and reactance is varied, a current change will exist in the circuit including the detector 9, the potential source 13 and the primary 14 of an inductive coupling such that a secondary 15 of the coupling will be energized. The output from the secondary 15 is connected to an amplifier 16 of conventional construction, and the output of this amplifier is impressed on a string galvanometer 17 including a base plate 18 and a spring 19. It is therefore apparent that the vibration of the string will be functionally related to the compressional waves which are changing the resistance and reactance of the rubber material 12 in the detector 9. Accordingly, it is necessary only to provide a light source 20, suitable lenses 21, 22 and 23 and slots in the pole pieces 24 of the galvanometer to produce a visible record of the vibrations of the string, which record can be projected onto photographic film indicated at 25 to record a trace. Note that the film at 25 is moved in the direction of the arrow and that a timing wheel 26 is provided, the spokes of which intercept the light path between lenses 22 and 23 at predetermined intervals to project transverse timing lines on the film 25.

Figure 1:
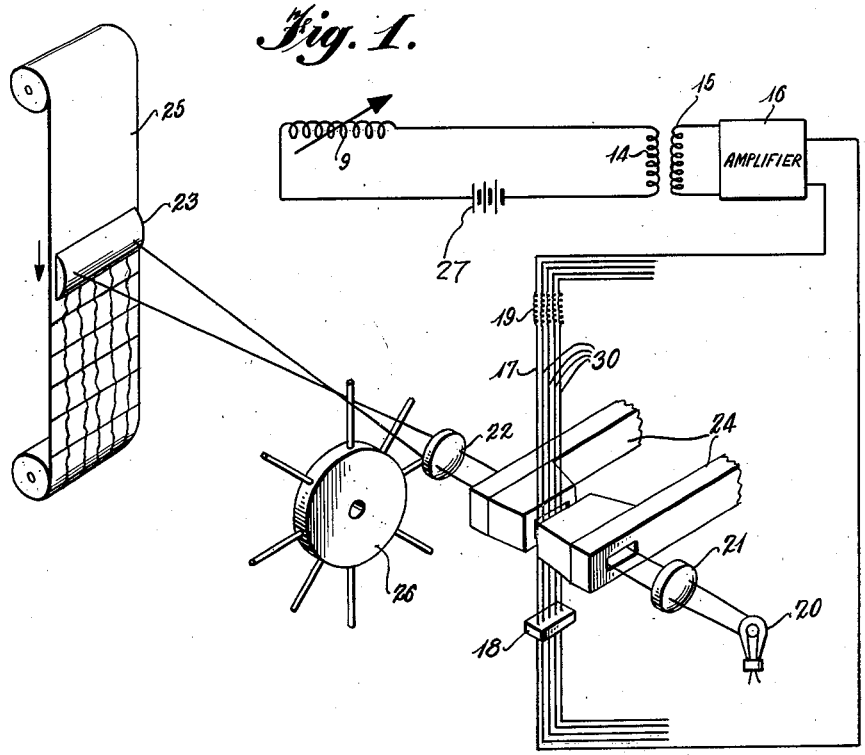
Figure 1 is a schematic perspective view illustrating a recording oscillograph in circuit with a seismometer constructed in accordance with the teachings of the present invention.

While the connections just described have related only to a single string which bears a reference numeral 17, it is apparent that a number of additional strings 27, 28, 29 and 30 may be connected to detectors of the type shown in Figure 2 connected in circuits of the type shown in Figure 1. The several seismometers are distributed about the location to be prospected and each will respond to and record on the film 25 the compressional waves received by it.

Due to the fact that the detector 9 is elongated, it is quite apparent that if its length is selected as equal to the full wave length of ground disturbances, the full positive and negative half-waves will be received concurrently and will produce a negative and positive deformation having an algebraic sum equal to zero. Thus the resistance and reactance of the detector 9 will not change and no current change will exist at the primary 14. This being the case, the several seismometers are so distributed on location as to lie in alignment radially of the shot point. Thus, each of them is in a position to receive a horizontal ground wave axially of the detector. The seismometers are, of course, spaced apart from one another about the location and may lie on the same or different radii of the shot point. The desired waves coming in at angles approaching a right angle to the long axis of the seismometer, are received thereby in such a way as to cause sequential compression and expansion of the rubber 12 throughout the length of the seismometer resulting in a change in the resistance thereof and the production of a signal which is amplified and impressed upon the appropriate string for recording on the tape 25.

While the foregoing description has been with reference to a seismometer according to the present invention having a length equal to the wave length of the desired signal, it is apparent that the selective effect or resolving power of the seismometer can be achieved by making it of any length equal to the product of the length of the undesired wave multiplied by a whole number.

The elongation of the seismometer and its horizontal disposition on the ground has an important resolving effect regardless of the length of the seismometer relative to the wave length of the undesired signals. This is apparent when it is borne in mind that random noises at ground level will come in at different frequencies and in various phase relationships relative to one another. Consequently, a large measure of cancellation will occur in any elongate seismometer constructed according to the teachings of the present invention regardless of its length. The desired signals, on the other hand, tend to arrive in phase and consequently produce sharply distinguishable variations in the output of the seismometer.

While the invention has been described with respect to string galvanometers and a shadow-type timing wheel, it is apparent that mirror galvanometers and a shutter-type timing wheel can be used with the detectors of the present invention.

Figure 4:
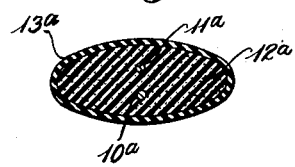
Figure 4 is a sectional view similar to Figure 3 but illustrating a modification of the form of conductors which may be utilized in the seismometer of the present invention.

The foregoing description has not made reference to Figure 4. This figure in operation functions in the manner described in conjunction with the embodiment of Figures 2 and 3 and differs from the embodiment of those figures only in that the conductors 10a and 11a are cylindrical rather than flat or ribbon-like. In Figure 4 the carbon-impregnated rubber material is represented by reference character 12a and the sheath by reference character 13a. Material 12a and sheath 13a may correspond in structure and function to sheath 13 and material 12 respectively.

The cross sectional configuration of the seismometer is, of course, susceptible of variation, but the flattened cylinder illustrated in the drawings is advantageous because it is easy to construct and serves to maintain the conductors in vertically spaced relationship during operation.

It will be understood that the resistance of the material 12 may be such that a current will flow in the circuit including the detector 9, the primary 14, and the battery 13. Unless there is a change in this current, no response by the secondary 15 will occur. Further, it is understood that the device herein illustrated in the form of a seismometer may, with equal facility, be utilized as a differential device similar to a double button carbon microphone or as a device to modulate an alternating current, should it prove desirable to operate on one or more of the numerous "carrier" systems.

What is claimed is:

In a system for the detection and recording of seismic waves that includes a series of seismometers, a series of amplifiers connected to said seismometers to amplify the electrical outputs thereof, and a multiple recorder connected to said amplifiers to simultaneously record the outputs thereof, the improvement that comprises including in said combination seismometers that comprise a pair of elongated conductors spaced apart and held in substantial parallelism by a resilient compressible material, the conductivity of which varies with the amount of compression, said material being rubber impregnated with particles of carbon, a sheath of nonconductive flexible material to envelop said conductors and said compressible material, one end of each of said conductors projecting from said sheath, said conductors being approximately equal in length to a whole number multiple of the wave length of an undesired signal.

ROBERT W. OLSON.

REFERENCES CITED

The following references are of record in the file of this patent:

UNITED STATES PATENTS

| Number | Name | Date |
| --- | --- | --- |
| 587,654 | Enholm | Aug. 3, 1897 |
| 2,044,080 | Kemper | June 16, 1936 |
| 2,138,310 | Svenson | Nov. 29, 1938 |
| 2,305,717 | La Bell | Dec. 22, 1942 |
| 2,340,772 | McCarty | Jan. 25, 1944 |
| 2,354,548 | Ricker | July 25, 1944 |
| 2,354,659 | Buzhaw et al. | Aug. 1, 1944 |
| 2,364,209 | Green | Dec. 5, 1944 |
| 2,394,900 | Eisler et al. | Feb. 19, 1946 |
| 2,424,561 | Edwards et al. | July 29, 1947 |
| 2,445,660 | Bruestle | July 20, 1948 |
| 2,471,601 | Albright | May 31, 1949 |
| 2,472,214 | Hurvitz | June 7, 1949 |
| 2,499,605 | Nicolson | Mar. 7, 1950 |
| 2,548,947 | Clewell | Apr. 17, 1951 |